(12) United States Patent
Song

(10) Patent No.: US 8,928,731 B2
(45) Date of Patent: Jan. 6, 2015

(54) PANORAMA PHOTOGRAPHY METHOD AND APPARATUS CAPABLE OF INFORMING OPTIMUM PHOTOGRAPHING POSITION

(75) Inventor: Gun Chul Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 1519 days.

(21) Appl. No.: 11/778,348

(22) Filed: Jul. 16, 2007

(65) Prior Publication Data

US 2008/0043093 A1 Feb. 21, 2008

(30) Foreign Application Priority Data

Aug. 16, 2006 (KR) ........................ 10-2006-0077044

(51) Int. Cl.
- H04N 7/00 (2011.01)
- H04N 5/262 (2006.01)
- H04N 5/232 (2006.01)
- G03B 37/04 (2006.01)
- G06T 3/40 (2006.01)
- G06T 7/00 (2006.01)

(52) U.S. Cl.
CPC ............ H04N 5/23293 (2013.01); G03B 37/04 (2013.01); G06T 3/4038 (2013.01); G06T 7/0026 (2013.01); H04N 5/23238 (2013.01)
USPC ................................ 348/39; 348/36; 348/239

(58) Field of Classification Search
USPC ...................................... 348/36, 239; 382/284
See application file for complete search history.

(56) References Cited

U.S. PATENT DOCUMENTS

| 7,194,112 B2* | 3/2007 | Chen et al. ..................... 382/106 |
| 7,844,130 B2* | 11/2010 | Dong et al. ..................... 382/284 |
| 2001/0045986 A1* | 11/2001 | Edwards ....................... 348/239 |
| 2002/0140829 A1* | 10/2002 | Colavin et al. ........... 348/231.99 |
| 2002/0163582 A1* | 11/2002 | Gruber et al. .............. 348/218.1 |
| 2004/0189849 A1 | 9/2004 | Hofer |
| 2005/0063608 A1* | 3/2005 | Clarke et al. .................. 382/284 |
| 2005/0168594 A1* | 8/2005 | Larson ....................... 348/222.1 |
| 2005/0179787 A1 | 8/2005 | Webb |
| 2006/0153447 A1* | 7/2006 | Ouchi ........................... 382/173 |
| 2007/0030341 A1* | 2/2007 | Morimoto ....................... 348/36 |
| 2007/0081081 A1* | 4/2007 | Cheng ......................... 348/218.1 |
| 2007/0200926 A1* | 8/2007 | Chianglin ....................... 348/36 |
| 2008/0266408 A1* | 10/2008 | Kim ........................... 348/218.1 |
| 2010/0239174 A1* | 9/2010 | Oh et al. ...................... 382/199 |
| 2011/0069149 A1* | 3/2011 | Park et al. ....................... 348/36 |

FOREIGN PATENT DOCUMENTS

| JP | 11-261939 | 9/1999 |
| JP | 2005-184533 | 7/2005 |

(Continued)

Primary Examiner — Minh-Chau Nguyen
(74) Attorney, Agent, or Firm — The Farrell Law Firm, P.C.

(57) ABSTRACT

A panorama photography method and apparatus is provided to inform a use of an optimum photographing position for the next photograph when capturing in succession several adjacent photographs to obtain a combined panorama photograph. In the method, after a first image is captured, a guide image is generated from a predefined section of the first image, and a first edge is detected in the guide image. A preview image is acquired for a second image to be captured, and a second edge is detected in the preview image. The second edge is obtained from a predefined part of the preview image that coincides with the guide image. Based on comparison between the first and second edges, notification data are generated and outputted together with a synthetic image of the guide image and the preview image.

12 Claims, 6 Drawing Sheets

(56) References Cited

FOREIGN PATENT DOCUMENTS

| | | |
|---|---|---|
| JP | 2005-223902 | 8/2005 |
| JP | 2005-223905 | 8/2005 |
| KR | 10-0414040 | 12/2003 |
| WO | WO 2006/002796 | 1/2006 |
| WO | WO 2006/085827 | 8/2006 |

* cited by examiner

PANORAMA PHOTOGRAPHY METHOD AND APPARATUS CAPABLE OF INFORMING OPTIMUM PHOTOGRAPHING POSITION

PRIORITY

This application claims priority under 35 U.S.C. §119 to the Korean Patent Application No. 2006-77044, which was filed in the Korean Intellectual Property Office on Aug. 16, 2006, the contents of which are incorporated by reference herein in its entirety.

BACKGROUND OF THE INVENTION

1. Field of the Invention

The present invention relates generally to panoramic photograph technology and, more particularly, to a panorama photography method and an apparatus that informs a user of an optimum photographing position for the next photograph when capturing in succession several photographs of adjacent scenes to obtain a combined panorama photograph.

2. Description of the Related Art

Panoramic photography is a style of photography that aims to create images with exceptionally wide fields of view. Modern digital camera technology allows continuously capturing multiple images around 360 degrees for a single wide image. The principle of the panoramic photography is to stitch together widthwise or lengthwise multiple photographs, each of which forms a segment of the panorama. Each photograph is obtained by rotation of a camera at regular angles, and captures a scene which partially overlaps the scenes of adjacent photographs. Then these photographs automatically combine into a single panoramic photograph through a proper program in a personal computer. A significant point of the panoramic photography is to align overlapping images so as to exactly combine them.

FIGS. 1A and 1B are example views that illustrate a conventional panorama photography method. If a user takes two adjacent photographs from left to right, FIG. 1A represents a previously captured image 10 (hereinafter, a first image) and FIG. 1B represents a preview image 20 for the next image (hereinafter, a second image) to be captured.

After the first image 10 is captured, the preview image 20 is offered in advance to assist a user in capturing the second image. At this time, a partial section 12 of the first image 10 is also offered, partly covering the preview image 20. This section 12 of the first image 10 may help a user to exactly capture the second image, thus being called a guide image.

The guide image 12 on the preview image 20 is useful to a user in choosing an exact photographing position for capturing the second image. However, such use of the guide image 12 may often inconvenience the user. That is to say, since a user has no choice but to depend on eye measurement, it may be difficult for a user to find an optimum photographing position.

SUMMARY OF THE INVENTION

An aspect of the present invention is to provide a panorama photography method and an apparatus that inform a user of an optimum photographing position for the next photograph when capturing in succession several photographs of abutting scenes to obtain a combined panorama photograph.

Another aspect of the present invention is to provide a panorama photography method and an apparatus that offer an optimum photographing position based on objective data without relying on user's eye measurement when taking a panoramic photograph.

According to an exemplary embodiment of the present invention, a panorama photography method comprises capturing a first image for a segment of a panorama photograph; generating a guide image from a predefined section of the first image; detecting a first edge in the guide image; acquiring a preview image for a second image to be captured, the second image being adjacent to the first image on the side of the guide image; detecting a second edge in the preview image, the second edge being obtained from a predefined part of the preview image that coincides with the guide image; comparing the first edge with the second edge; generating notification data based on a comparison result of the edges, and a synthetic image of the guide image and the preview image; and outputting the synthetic image together with the notification data.

In this method, the step of comparing of the edges may include calculating a coefficient of a correlation between the first and second edges, and comparing the calculated correlation coefficient with a given critical value. In this case, the step of generating of the notification data may include generating different notification data according to a comparison result between the correlation coefficient and the critical value.

Additionally, the step of comparing of the edges may include calculating a coefficient of a correlation between the first and second edges, and determining whether the calculated correlation coefficient is less than a first critical value or greater than a second critical value, the first critical value being less than the second critical value. In this case, the step of generating of the notification data may include generating first notification data when the correlation coefficient is less than the first critical value, generating second notification data when the correlation coefficient is between the first and second critical values, and generating third notification data when the correlation coefficient is greater than the second critical value.

Furthermore, the step of outputting of the notification data may include displaying the notification data with visual forms and/or audio forms. The notification data may have different visual and/or audio properties according to a comparison result of the edges.

The method of the invention may further comprise capturing a second image when a photographing request is inputted after the outputting of the notification data.

According to another exemplary embodiment of the present invention, a panorama photography apparatus comprises a camera module capturing a first image for a segment of a panorama photograph and acquiring a preview image for a second image adjacent to the first image; a guide image generator generating a guide image from a predefined section of the first image; an edge detector detecting a first edge in the guide image and a second edge in the preview image, the second edge being obtained from a predefined part of the preview image that coincides with the guide image; an edge comparator comparing the first edge with the second edge; a user interface generator generating a synthetic image of the guide image and the preview image and further generating notification data based on a comparison result of the edges; and a display unit displaying the synthetic image and further outputting the notification data with visual forms.

This apparatus may further comprise a speaker outputting the notification data as audio data.

BRIEF DESCRIPTION OF THE DRAWINGS

The above and other aspects, features and advantages of the present invention will become more apparent from the following detailed description, when taken in conjunction with the accompanying drawings in which.

DETAILED DESCRIPTION OF THE INVENTION

Figure 1A:
FIGS. 1A and 1B are example views illustrating a conventional panorama photography method.

Exemplary, non-limiting embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Well-known structures and processes are not described or illustrated in detail to avoid obscuring the essence of the present invention. Like reference numerals are used for like and corresponding parts of the various drawings.

Figure 2:
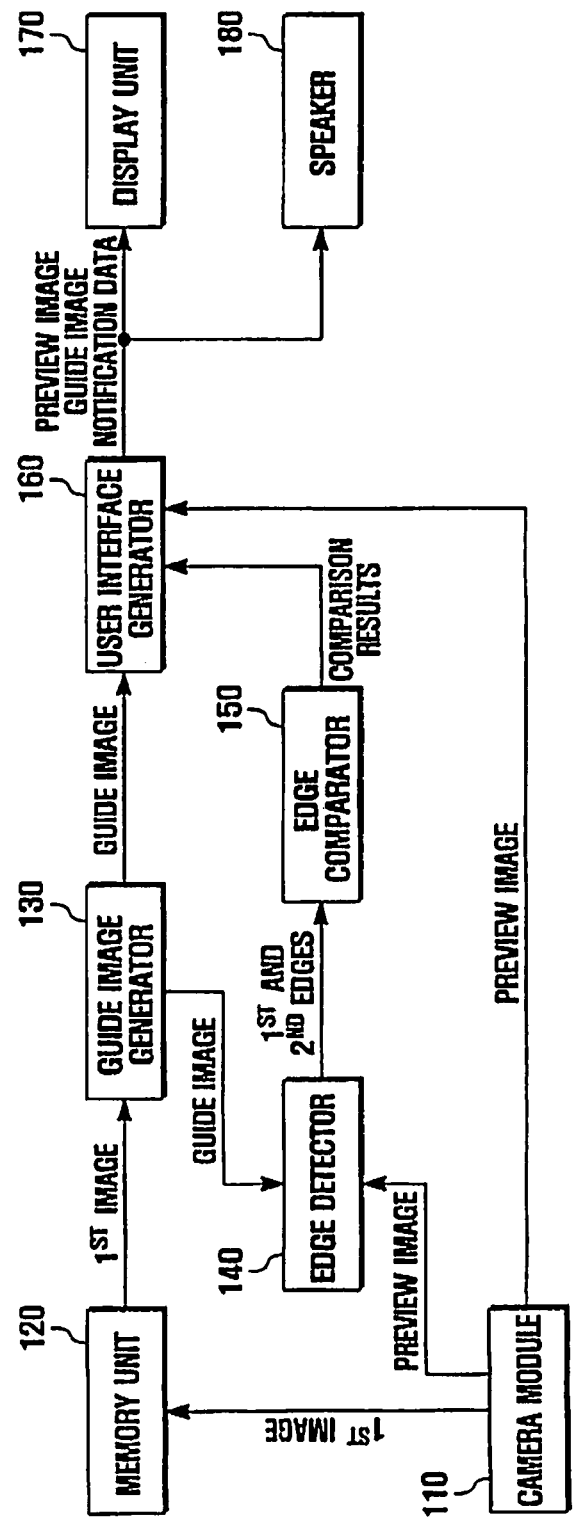
FIG. 2 is a block diagram showing a panorama photography apparatus in accordance with an exemplary embodiment of the present invention.

Referring to FIG. 2, the panorama photography apparatus includes a camera module 110, a memory unit 120, a guide image generator 130, an edge detector 140, an edge comparator 150, a user interface generator 160, a display unit 170, and a speaker 180.

The camera module 110 captures images to compose a panorama photograph and acquires a preview image showing in advance an image to be captured. Specifically, after capturing a first image, the camera module 110 acquires a preview image for capturing a second image.

The memory unit 120 stores images the camera module 110 captures. Specifically, the memory unit 120 receives the captured first image from the camera module 110 and preserves it.

The guide image generator 130 generates a guide image to be used for determining an optimum photographing position for capturing the second image. Specifically, the guide image generator 130 receives the first image from the memory unit 120 and obtains the guide image from a predefined section of the first image.

The edge detector 140 detects a first edge in the guide image and a second edge in the preview image. Specifically, the edge detector 140 receives the guide image from the guide image generator 130 and then extracts the first edge from the guide image. Similarly, the edge detector 140 receives the preview image from the camera module 110 and then extracts the second edge from the preview image. The second edge is detected in an area of the preview image that overlaps the guide image.

The edge comparator 150 compares the first edge with the second edge and then determines a correlation between both edges. Specifically, the edge comparator 150 receives the first and second edges from the edge detector 140, calculates the coefficient of a correlation between both edges, and compares the calculated coefficient with a given critical value.

The User Interface (UI) generator 160 receives the guide image and the preview image from the guide image generator 130 and the camera module 110, respectively. Then the UI generator 160 synthesizes both received images. Additionally, the UI generator 160 receives the results of edge comparison from the edge comparator 150 and then generates notification data based on the comparison results. These notification data may vary according to the comparison results between the correlation coefficient and the critical value. Such notification data may be presented in a variety of visual and/or audio forms such as icons, indicators, arrows, numerical values, and sounds.

The display unit 170 represents a synthetic image of the preview image and the guide image that the UI generator 160 offers. Additionally, the display unit 170 exhibits the notification data with visual forms such as icons that the UI generator 160 also offers.

The speaker 180 outputs the notification data with audio forms such as sounds that the UI generator 160 offers.

Figure 1B:
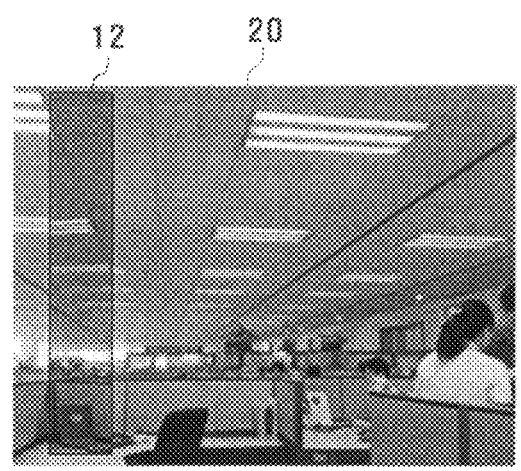
Figure 3:
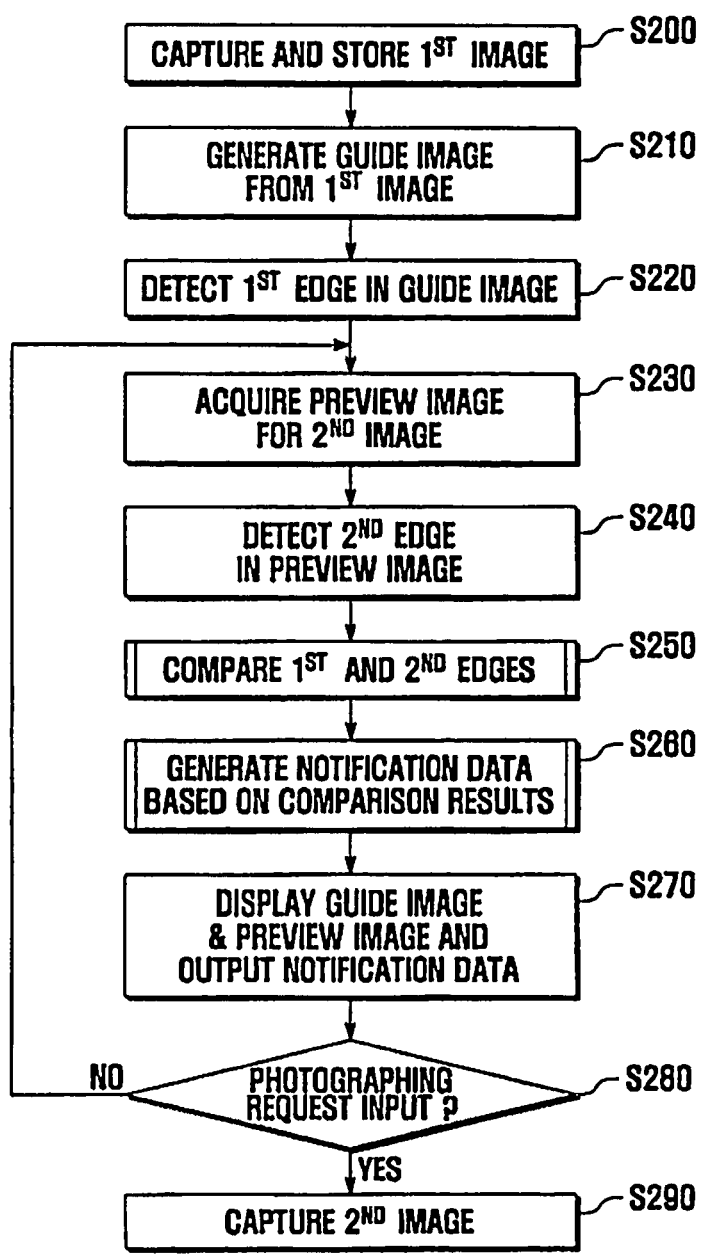
FIG. 3 is a flow diagram showing a panorama photography method in accordance with an exemplary embodiment of the present invention.

Hereinafter, a panorama photography method executed in the above-discussed apparatus is described through an exemplary embodiment thereof. Referring to FIG. 3 together with FIGS. 1A, 1B and 2, in step S200 the camera module 110 captures the first image 10 that will be a segment of a panorama photograph, and then sends the captured first image 10 to the memory unit 120 to store it.

Figure 4A:
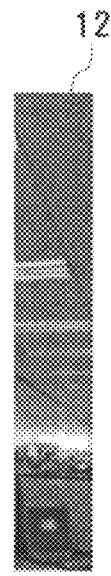
FIGS. 4A and 4B are example views respectively illustrating a guide image and an edge detected from the guide image.

Next, in step S210 the guide image generator 130 generates the guide image 12 by detecting a predefined section from the first image 10 stored in the memory unit 120. The guide image 12 will be synthesized to the preview image 20 of the second image to assist a more exact capture of the second image. The section of the first image 10 assigned to the guide image 12 is predefined to occupy 10~20% of the entire first image 10. This section for the guide image 12 is located at a peripheral region of the first image 10 in the same direction as a photographing position shifts. That is, if a photographing position is changed rightward, the guide image 12 is detected near the right edge of the first image 10. FIG. 4A shows an example of the detected guide image 12. If the first image 10 has 2,160 pixels from right to left and 1,440 pixels from top to bottom, the guide image 12 can be defined as $163^{th}$~$432^{th}$ pixels from right and $73^{th}$~$1368^{th}$ pixels from top, for example.

Figure 4B:
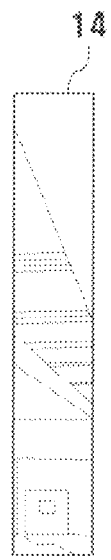

Next, in step S220 the edge detector 140 detects the first edge in the guide image 12. An edge, a terminology well known in the art related to the digital image analysis technology, means points at which the luminous intensity changes sharply over a number of pixels. Sharp changes in image properties usually reflect discontinuities in depth, discontinuities in surface orientation, changes in material properties, and variations in scene illumination. FIG. 4B shows an example of the edge 14 detected in the guide image 12 shown in FIG. 4A.

After capturing the first image 10, in step S230 the camera module 110 acquires the preview image 20 that exhibits in advance an image to assist a capture of the second image. The second image is adjacent in time and space to the first image 10, thus forming another segment of a panorama photograph.

Next, in step S240 the edge detector 140 detects a second edge in the preview image 20. The second edge is obtained from a predefined part that coincides with the guide image 12. That is, a target area for detection of the second edge in the preview image 20 is a portion covered with the guide image 12 when the preview image 20 and the guide image 12 are synthesized. As discussed above, the location of the guide image 12 is predefined in the first image 10. In addition, when the guide image 12 overlaps the preview image 20, the overlap location on the preview image 20 is opposite to the original location of the guide image 12 in the first image 10. That is, in the aforementioned example, the guide image 12 will be located on $163^{th}$~$432^{th}$ pixels from left and $73^{th}$~$1368^{th}$ pixels from top of the preview image 20. And the second edge is also extracted from the same pixels of the preview image 20. Hereinafter, a target area in the preview image 20 from which the second edge is extracted will be referred to as a comparison part.

After the first and second edges are detected, in step S250 the edge comparator 150 receives the first and second edges from the edge detector 140 and compares them. This step S250 is a procedure to determine the degree of correspondence between the guide image 12 and a comparison part of the preview image 20. This step S250 may be performed by means of well known image analysis technique. For example, the edge comparator 150 calculates the coefficient of a correlation between the first and second edges, and compares the calculated correlation coefficient with a given critical value.

The results of edge comparison are sent to the UI generator 160. Then, in step S260 the UI generator 160 generates notification data based on the edge comparison results. For example, the UI generator 160 generates different notification data according to the comparison results between the correlation coefficient and the critical value.

Figure 5:
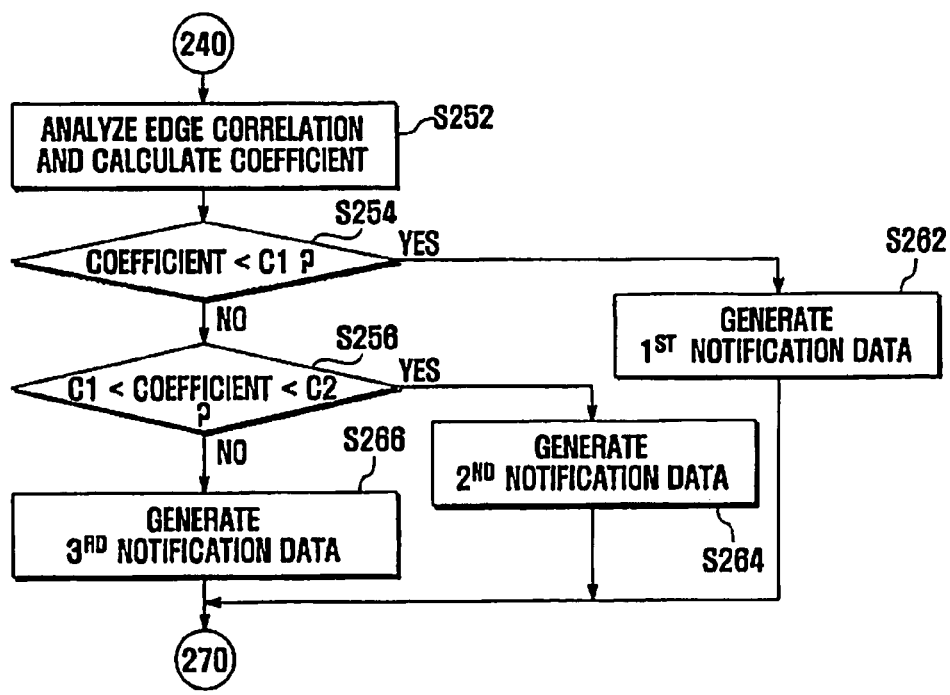
FIG. 5 is a flow diagram showing an edge comparison step and a notification data generation step.

Shown in FIG. 5 is an example of the above-discussed edge comparison step S250 and notification data generation step S260.

Referring to FIG. 5, in step S252 the edge comparator analyzes a correlation between the first and second edges and then calculates the coefficient of the correlation. This correlation coefficient may be calculated with respect to edge properties by division parts into which an image is divided. Such division parts may be pixel, block, quad tree, etc. Edge properties may be brightness and RGB (Red Green Blue) color in case of pixel, and average of brightness and variance of brightness in case of block. In another example, the coefficient of a correlation may be calculated with respect to a vector difference of edges without dividing an image. Analysis and calculation of the correlation coefficient are well known in the art related to the digital image analysis, so detailed description will be omitted.

The coefficient of a correlation represents the degree of reciprocal relationship between the first and second edges. Low or high coefficient means that there is far or close relationship in space between the first and second edges. After calculating the coefficient of a correlation, the edge comparator determines a range to which the coefficient belongs. Specifically, in step S254 the edge comparator determines whether the coefficient is less than the first critical value (C1). When the coefficient is less, in step S262 the UI generator generates first notification data. Otherwise, when the coefficient is greater than the first critical value (C1), in step S256 the edge comparator determines whether the coefficient is less than the second critical value (C2), C2 is greater than C1. When the coefficient is between the first and second critical values, in step S264 the UI generator generates second notification data. When the coefficient is greater that the second critical value (C2), in step S266 the UI generator generates third notification data.

The first notification data tell a relatively lower relationship, whereas the third notification data tell a relatively higher relationship. If the second critical value (C2) is suitably set, the third notification data can be generated at the point where the first and second edges coincide exactly.

Such notification data have different properties. For example, in case the notification data are icons, each icon has different visual properties such as color, brightness, chroma, shape, number, etc. Similarly, in case the notification data are sounds, each sound has different audio properties such as tone, amplitude, frequency, etc.

Returning to FIG. 3, the UI generator 160 not only generates the notification data in step S260, but also generates a synthetic image of the guide image 12 and the preview image 20. The display unit 170 outputs the synthetic image together with the notification data in visual forms such as icons in step S270. In addition, the speaker 180 outputs the notification data with audio forms such as sounds.

Figure 6A:
FIGS. 6A to 6C are example views illustrating three types of output of notification data.
Figure 6B:
Figure 6C:

FIGS. 6A to 6C are example views that illustrate three types of output of notification data according to a correlation between the guide image 12 and the comparison part 22 of the preview image 20.

FIG. 6A shows an example of a relatively lower correlation between the guide image 12 and the comparison part 22. That is, in this case, the correlation coefficient between the first and second edges is less than the first critical value C1. This result informs a user that the current photographing position is not optimum. At this time, an informing icon 24a can be a 'white' icon and an informing sound can be a discontinuous slow beep sound such as 'toot, -, toot, -, toot, -, toot, -', for example.

FIG. 6B shows an example of a relatively middle correlation between the guide image 12 and the comparison part 22. In this case, the correlation coefficient between the first and second edges is between the first and second critical values Cl and C2. This result means that the current photographing position is better than before but not optimum. At this time, an informing icon 24b can be a 'yellow' icon and an informing sound can be a discontinuous fast beep sound such as 'toot, toot, toot, toot, toot, toot, toot, toot', for example.

FIG. 6C shows an example of a relatively higher correlation between the guide image 12 and the comparison part 22. In this case, the correlation coefficient between the first and second edges is greater than the second critical value C2. This result means the current photographing position is optimum. At this time, an informing icon 24c is a 'green' icon and an informing sound is a continuous beep sound such as 'toot, - - - '.

Returning to FIG. 3, after the synthetic image and the notification data are outputted together in step S270, a control unit (not shown) determines whether a photographing request is inputted in step S280. If there is a photographing request, in step S290 the camera module 110 captures the second image at the current photographing position under the control of the control unit. If there is no photographing request, the camera module 110 returns to the above-described step S230 and acquires again the preview image.

In other words, while watching and/or listening to the output of the notification data in step S270, a user may judge if the current position is suitable for taking a photograph. If the current position is deemed optimum, a user may press a button in step S280 and take a photograph in step S290. Otherwise, if the current position is deemed non-optimum, a user may change a photographing position.

In the above-discussed embodiment, two critical values are used and thereby three types of notification data are generated. This is, however, for description only and not to be considered as a limitation of the present invention. It is also possible to use a single or three critical values to generate notification data. Additionally, since the location of the guide image on the first image is determined depending on a shifting direction of photographing positions, the panorama photography apparatus of the present invention may further include a well-known sensor capable of automatically detecting a movement of the camera module.

The panorama photography method and apparatus of the present invention may be applied to a mobile phone, a digital camera, and any other electronic devices having a camera module.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A panorama photography method comprising:
    capturing a first image for a segment of a panorama photograph;
    generating a guide image from a predefined section of the first image;
    detecting a first edge in the guide image;
    acquiring a preview image for a second image to be captured, the second image being adjacent to the first image;
    detecting a second edge in the preview image, the second edge being obtained from a predefined part of the preview image, the predefined part coinciding with the guide image;
    comparing the first edge with the second edge to determine a degree of correspondence between the first edge and the second edge;
    generating notification data, indicating a degree of correlation between the guide image and the predefined part of the preview image, based on a comparison of the degree of correspondence between the first edge and the second edge with at least one critical value, and a synthetic image synthesized from the guide image and the preview image; and
    outputting the synthetic image and the notification data.

2. The method of claim 1, wherein the step of comparing the first edge with the second edge comprises calculating a coefficient of a correlation between the first and second edges, and comparing the calculated correlation coefficient with a predetermined critical value.

3. The method of claim 2, wherein the step of generating notification data comprises generating different notification data according to a comparison result between the calculated correlation coefficient and the predetermined critical value.

4. The method of claim 1, wherein the step of comparing the first edge with the second edge comprises calculating a coefficient of a correlation between the first and second edges, and determining whether the calculated correlation coefficient is less than a first critical value or greater than a second critical value, the first critical value being less than the second critical value.

5. The method of claim 4, wherein the step of generating notification data comprises generating first notification data when the correlation coefficient is less than the first critical value, generating second notification data when the correlation coefficient is between the first and second critical values, and generating third notification data when the correlation coefficient is greater than the second critical value.

6. The method of claim 1, wherein the step of outputting the notification data comprises displaying the notification data in a visual form.

7. The method of claim 6, wherein the notification data have different visual properties according to a comparison result of the first and second edges.

8. The method of claim 1, wherein the step of outputting the notification data comprises outputting the notification data in an audio form.

9. The method of claim 8, wherein the notification data have different audio properties according to a comparison result of the first and second edges.

10. The method of claim 1, further comprising:
    capturing the second image when a photographing request is input after the output of the notification data.

11. A panorama photography apparatus comprising:
    a camera device configured to capture a first image for a segment of a panorama photograph and acquire a preview image for a second image adjacent to the first image;
    a guide image generator configured to generate a guide image from a predefined section of the first image;
    an edge detector configured to detect a first edge in the guide image and a second edge in the preview image, the second edge being obtained from a predefined part of the preview image, the predefined part coinciding with the guide image;
    an edge comparator configured to compare the first edge with the second edge to determine a degree of correspondence between the first edge and the second edge;
    a user interface generator configured to generate a synthetic image synthesized from the guide image and the preview image and further generate notification data, indicating a degree of correlation between the guide image and the predefined part of the preview image, based on a comparison of the degree of correspondence between the first edge and the second edge with at least one critical value; and
    a display device configured to present the synthetic image and further output the notification data in a visual form.

12. The apparatus of claim 11, further comprising:
    a speaker configured to output the notification data in an audio form.

* * * * *